United States Patent [19]

Mills

[11] Patent Number: 4,460,342

[45] Date of Patent: Jul. 17, 1984

[54] AID FOR SPEECH THERAPY AND A METHOD OF MAKING SAME

[75] Inventor: Michael Mills, Pointe Claire, Canada

[73] Assignee: M.B.A. Therapeutic Language Systems Inc., Westmount, Canada

[21] Appl. No.: 388,646

[22] Filed: Jun. 15, 1982

[51] Int. Cl.³ .............................................. G09B 19/04
[52] U.S. Cl. ..................................... 434/185; 434/312
[58] Field of Search ................ 434/185, 312, 112, 311

[56] References Cited

U.S. PATENT DOCUMENTS

| | | | | |
|---|---|---|---|---|
| 660,255 | 10/1900 | Kingma | ................................ | 434/185 |
| 2,533,010 | 12/1950 | Henabery | ............................ | 434/185 |
| 3,289,326 | 12/1966 | Bender | ................................ | 434/312 |
| 4,218,836 | 8/1980 | Acres | ................................... | 434/185 |

Primary Examiner—William H. Grieb
Attorney, Agent, or Firm—Oblon, Fisher, Spivak, McClelland & Maier

[57] ABSTRACT

An aid for speech therapy comprising a chart having a series of time frames of equal time intervals. Each of the time frames has an illustration of the human mouth to pictorially display the lips, tongue and jaw positions of the mouth in making a sound, word or phrase alphabetically displayed in the time frames. A sound reproducing device may also be provided to audibly reproduce the sound, word or phrase which is alphabetically displayed.

8 Claims, 1 Drawing Figure

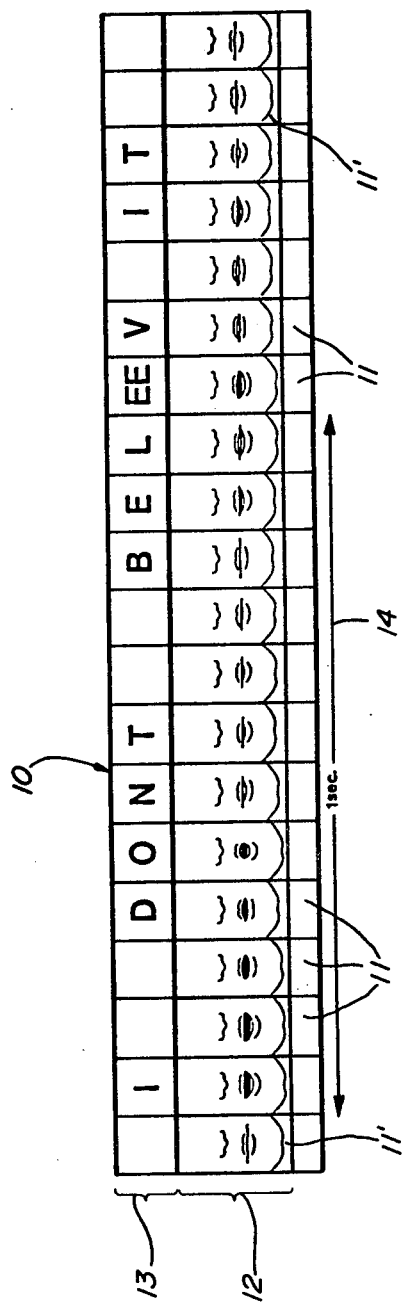

AID FOR SPEECH THERAPY AND A METHOD OF MAKING SAME

BACKGROUND OF INVENTION (a) Field of Invention

The present invention relates to an improved speech therapy teaching aid wherein a chart is provided having a series of time frames of equal time intervals on which is illustrated a pictorial display of a human mouth and an alphabetical display of the sound coinciding with the illustrated movements of the mouth.

(b) Description of the Prior Art

Several systems have been heretofore provided to teach speech. However, these systems are extremely complex and costly and a great many have proven unsatisfactory. Further, such known systems have limited applications and cannot teach speech or lip reading to the deaf. For example, U.S. Pat. No. 4,218,836 teaches a speech therapy system comprising a series of complex mouth, tongue and lip positions as well as a code to represent nasality, inspirations, aspirations, etc. Such system is complex and does not, like other known systems, provide a time base associated with mouth movement to pronounce a sound to teach points of emphasis in a sound, length of syllables, pacing, pauses and timing.

SUMMARY OF INVENTION

It is a feature of the present invention to provide a speech therapy teaching aid which overcomes the disadvantages of the prior art.

Another feature of the present invention is to provide a speech therapy teaching aid comprising a chart having a series of time frames of equal time intervals in which a pictorial illustration of mouth movement and positions and an alphabetical display of a sound to be made by following such mouth movements.

Another feature of the present invention is to provide a sound carrying element to allow the pre-recorded sounds to be audibly reproduced in conformity with the sound alphabetically and graphically displayed on the chart.

A further feature of the present invention is to provide a speech therapy teaching aid which is designed for use by speech therapists or pathologists as part of an ongoing therapy in the training or retraining of individuals in reference to speech or language problems. It is simple and can be used, in some cases, by the patient, without the assistance of a speech therapist.

Another feature of the present invention is to provide a novel method of making a chart for speech therapy from a pre-recorded sound, word or phrase, and to provide a display of the mouth movements for pronouncing the exact sound, word or phrase as recorded. The chart also contains an alphabetical display of the sound, word or phrase over a precise time sequence.

According to the above features, from a broad aspect, the present invention provides a speech therapy teaching aid comprising a chart having a series of time frames of equal time intervals. Each of the time frames has an illustration of a human mouth to pictorially display the lips, tongue and jaw positions of the mouth in making a sound alphabetically displayed in the time frames.

According to a further broad aspect of the present invention, there is provided a method of making a chart for speech therapy comprising the steps of recording on a sound track a sound to be reproduced by the user. The sound is then transferred from the sound track to a large format magnetic tape or an optical film. The sound on the magnetic tape or optical film is analyzed to determine the variations in sound and the corresponding variations in mouth movement to produce the sound. The sound is then split in predetermined equal time intervals and the mouth positions to reproduce the sound are pictorially illustrated in the time intervals provided on a chart as time frames. The time frames correspond exactly to the precise time intervals of the sound. The pictorial mouth positions illustrate the position of the lips, tongue and jaw during each time interval. An alphabetical display of the sound is also displayed in the time frames.

BRIEF DESCRIPTION OF DRAWING

A preferred embodiment of the invention will now be described with reference to the example thereof as illustrated by the accompanying drawing which is an illustration of the therapy teaching chart of the invention.

DESCRIPTION OF PREFERRED EMBODIMENTS

As shown in the drawing, the speech therapy teaching aid comprises a chart 10 which is of elongated rectangular form having vertically extending segments which define a series of time frames 11 of equal time intervals. These time frames are disposed side by side along the length of the chart. Each segment has a portion 12 in which there is illustrated the human mouth to pictorially display the lips, tongue and jaw positions of the mouth in producing a sound which is alphabetically displayed in a top portion 13 of the chart. As illustrated, the sound is a sentence "I DONT BELEEV IT". The words in this sentence are spaced apart by one or more time frames representative of the lapse time of said word. For example the word "I" has a time lapse of three time frames, thus three twelfths of a second time duration, in this case.

As herein shown, each of the time frames 11 are of a one-twelfth of a second duration. This time duration has been found satisfactory for breaking down a sound into its component parts for analysis. It is pointed out that the invention is not restricted to this specific time duration of the frames, as the sound can be broken down into different time intervals. However, if the time frames become much shorter or longer, the teaching aid would not be as efficient and may be even inoperable.

Although not shown, there is further provided a sound carrying element, such as a magnetic tape cassette on which is recorded the sound information of portion 13 of the chart and this sound is audibly reproduced to the patient learning to pronounce the phrase displayed in portion 13 of the chart. The time base of the chart is synchronized to the reproduced sound, as will be described later. Thus, the patient undergoing the therapy may listen to the sound track and at the same time tries to duplicate that sound by reading the sentence in portion 13 of the chart and moving his lips, tongue and jaw as illustrated in the portion 12 of the chart.

For teaching the deaf lip reading or speech, the audible reproduction of the sound is of no value. However, it is preferable in such cases to also illustrate on the chart a time scale such as 14 thereby providing the precise time sequence for the pronunciation of sounds, words or phrases visually displayed on the chart. The sequential illustration of the mouth movements graphically illustrates the progression of the tongue, lips and jaw in the pronunciation of the given sound(s) appearing in portion 13 of the chart. Thus, the time scale 14 in combination with the progression of mouth movements together with the alphabetical representation of the sound(s) at specific intervals of the time scale teaches points of emphasis, length of syllables, pacing, pauses and timing. Pauses may be illustrated, when desired, by showing a closed mouth illustration, such as at 11'.

The speech therapy teaching chart 10 was developed specifically for use by speech therapists or pathologists as part of an ongoing therapy in the training or retraining of individuals in reference to speech, language problems, and communication in general. It can also be used ideally by the patient, after some basic training, without the assistance of the speech therapist. It can be seen that the chart 10 relays the maximum information to the patient in the most unconfusing way and helps the patient to recall the ideal juxtaposition of lips, tongue and jaw and is a system that is ideally used for speech rehabilitation.

The method of making the chart consists in recording a sound to be taught, such as the phrase appearing in portion 13 of the chart 10, on a sound track. The sound from the sound track is then transferred to a magnetic tape or optical film for analysis whereby to determine the variations in sound and the corresponding variations in mouth movement to produce that sound. The analysis for the magnetic tape or optical film is made over or under a magnetic sound head or optical sound head, respectively. A device which is segmented in precise fractions of a second determines the precise location in time on the sound track of the beginning and end of each time frame in relation to the recorded sound. The sound head is connected to a speaker to determine the start and end of the sound.

The period or duration of the sound is then split in predetermined equal time intervals, herein one-twelfth of a second. A graph is then made with time frames equal to one-twelfth of a second and in each frame there is pictorially illustrated, in a first portion 12 thereof, the mouth position showing the lips, tongue and jaw position for that precise one-twelfth of a second period during the complete time period to produce the sound, word or phrase. An alphabetical display of the sound, word or phrase is also provided in a second portion 13 of the chart and in synchronism with the time scale 14 and the pictorial illustration of the mouth. These mouth illustrations may be provided as drawings or photographs. It is also conceived that the chart 10 may be filmed and transmitted on a video display screen and can be a very long chart moving across the screen. The chart may also be provided as a film projected on a screen in synchronism with a sound track.

In order to assure the accuracy of the pictorial mouth illustrations in synchronism with the sound track, these illustrations are then transferred onto a video film and the film is run in a projector together with the sound track and verified for its accuracy. Thus, the chart reproduced is shown to be extremely accurate.

It is within the ambit of the present invention to cover any obvious modifications of the preferred embodiment described herein, provided such modifications fall within the scope of the appended claims. For example, the graphics which are herein shown as a full frontal of the human face can also be a cross-section of the face arranged specifically to show the ideal positions of tongue, lips and jaw. Also, the alphabetical representation in the portion 13 of the chart may be represented phonetically as is the case with the spelling of the work "BELEEV". This helps to illustrate the emphasis in the pronunciation of syllables in certain words.

I claim:

1. A speech therapy visual teaching aid comprising an elongated rectangular chart having vertically extending segments disposed side by side along the length of said chart, each said segment corresponding to a precise equal time interval as indicated by a time scale displayed in association with said segments to form time frames, each said time frame having an illustration of the human mouth to graphically display the lips, tongue and jaw positions of the mouth in making a sound alphabetically displayed in an alphabet receiving portion of said time frames, said sound being constituted by one or more words, said words being displayed with one or more alphabet characters disposed in said alphabet receiving portion of said time frames in association with said illustrations and said time scale, said words being spaced apart by one or more time frames representative of the lapse time of said words.

2. A speech therapy teaching aid as claimed in claim 1 wherein there is further comprised a sound carrying element and sound reproducing means for audibly reproducing said sound, said time frames being synchronized to said reproduced sound.

3. A speech therapy teaching aid as claimed in claim 2 wherein said sound carrying element is a magnetic tape in a cassette, said sound reproducing means being a cassette player.

4. A speech therapy teaching aid as claimed in claim 1 wherein each said time intervals is one-twelfth of a second.

5. A speech therapy teaching aid as claimed in claim 1 wherein there is further provided time frames indicative of pause time.

6. A method of making a chart for speech therapy comprising the steps of:
   (i) recording on a sound track a sound to be taught;
   (ii) transferring said sound from said sound track to a large format magnetic tape or optical film;
   (iii) splitting said sound in predetermined equal time intervals;
   (iv) analyzing said sound on said magnetic tape or optical film at each said time intervals to determine the variations in sound and determining corresponding variations in graphical representations of positions to reproduce said sound;
   (v) producing said graphical representations of positions onto time frames of a chart; each frame having a pictorial display of the lips, tongue and jaw positions of said mouth;
   (vi) alphabetically displaying said sound in said time frames in synchronism with said pictorial displays of said mouth; and
   (vii) visually displaying said time intervals.

7. A method as claimed in claim 6 wherein there is further provided after step (vii) the steps of:
   (i) further transferring said pictorial mouth movements of said chart onto a video carrier; and
   (ii) running said video carrier in a projector in synchronism with said sound track to verify the accuracy of said pictorial displays of said mouth positions.

8. A method as claimed in claim 6 wherein said step (iv) comprises running said magnetic tape or optical film over or under a magnetic sound head or optical sound head at various speeds, said sound head being connected to an amplifier and speaker to establish precisely the voice modulations in order to give a precise time sequence of said recorded sound thus establishing and verifying the actual breakdown in terms of time.

* * * * *